United States Patent [19]

Mouton

[11] 4,423,967

[45] Jan. 3, 1984

[54] SYSTEM FOR MEASURING TEMPERATURES OF A FLOWING FLUID

[75] Inventor: Pierre C. Mouton, Grigny, France

[73] Assignee: Societe Nationale d'Etude et de Construction de Moteurs d'Aviation, "S.N.E.C.M.A.", Paris, France

[21] Appl. No.: 296,855

[22] Filed: Aug. 27, 1981

[30] Foreign Application Priority Data

Aug. 28, 1980 [FR] France ................................ 80 18638

[51] Int. Cl.³ ........................ G01K 13/08; G01K 7/02
[52] U.S. Cl. .................................... 374/138; 136/231; 374/144; 374/179
[58] Field of Search ............... 374/113, 115, 181, 182, 374/165, 166; 136/231

[56] References Cited

U.S. PATENT DOCUMENTS

| | | | |
|---|---|---|---|
| 2,496,806 | 2/1950 | Moffatt | 136/224 |
| 3,138,957 | 6/1964 | Brunson | 374/112 X |
| 3,417,617 | 12/1968 | Rall | 374/165 |
| 3,653,976 | 4/1972 | Miller et al. | 136/231 |
| 4,114,442 | 9/1978 | Pratt | 374/113 |
| 4,157,663 | 6/1979 | Ihlenfeldt et al. | 374/182 X |
| 4,163,388 | 8/1979 | November | 374/112 X |
| 4,186,605 | 2/1980 | Bourigault | 374/166 X |
| 4,242,907 | 1/1981 | Kazmierowicz | 374/113 |
| 4,279,153 | 7/1981 | Kervistin et al. | 374/138 |

FOREIGN PATENT DOCUMENTS

| | | | |
|---|---|---|---|
| 1287332 | 9/1969 | Fed. Rep. of Germany | 136/224 |
| 1648280 | 4/1972 | Fed. Rep. of Germany | 136/224 |
| 7826636 | 7/1980 | France | 136/224 |

Primary Examiner—Daniel M. Yasich
Attorney, Agent, or Firm—Oblon, Fisher, Spivak, McClelland & Maier

[57] ABSTRACT

System for measuring the temperature of a gas by sampling, having a measurement probe with a certain permanent error. The system includes in addition two corrective probes placed in contact with said gas sample, one of the probes having essentially the same error as the measurement probe, the other probe having a double error. These three probes are advantageously thermocouples connected in opposition in a predetermined order so that the measurement error $\Delta T$ obtained by the measurement probe in relation to the real temperature of the gases $T_g$ is compensated for by those from the corrective probes.

6 Claims, 8 Drawing Figures

SYSTEM FOR MEASURING TEMPERATURES OF A FLOWING FLUID

BACKGROUND OF THE INVENTION

1. Field of the Invention

The present invention concerns a system for measuring the temperature of a fluid of the type having a probe, called a measurement probe, located at a distance from the fluid on which the measurement is be made and placed in a sampling conduit within which flow of fluid occurs, the fluid, because of its conveyance over a distance, having at the point of measurement a certain error in the temperature in relation to that of the fluid on which the measurement is to be made.

2. Description of the Prior Art

Measurement of the temperature of gases at the downstream end of airplane jet engine combustion chambers, for example, is generally achieved by means of thermocouple pick-ups placed in the gas stream, generally between high-pressure and low-pressure turbine wheels. The intense flow of the gases around the pick-ups produces an almost instantaneous heating and temperature setting of the pick-ups, and thus a fairly accurate measurement of the temperature is achieved. However, the thermocouple pick-ups, or connectors, or weldings utilized are necessarily fine and delicate and, in such a harsh environment, they have a limited life, in particular because of the vibrations, burns, etc., which they undergo.

To remedy this drawback, it has been proposed in a corresponding application, now commonly assigned U.S. Pat. No. 4,279,153, to house these pick-ups inside fixed blades in the turbine nozzles and to have them measure the temperature of a gas sample taken from the stream through the blade. However, the sampling modifies the temperature of the air admitted around the probe, i.e. the temperature picked up by the probe is erroneous, either positively or negatively, and yet it is generally important that the pilot be informed with certainty of the air temperature.

SUMMARY OF THE INVENTION

The object of the present invention is to remedy this drawback and in particular is aimed at providing a system making it possible to be rid of this error associated with the air sampling and to obtain a reading as accurate as possible of the real gas temperature.

This object is attained according to the present invention by the fact that the system also includes two probes, called corrective probes, placed in the sampling conduits at various positions, one of the probes measuring the temperature with essentially the same error as the measurement probe, the other measuring this temperature with a double error:

a first mechanism of calculation to supply the difference $\Delta T$ between the signals $T_2$, $T_3$ supplied by the corrective probes, and a second mechanism of calculation to supply the signal $T = T_1 - \Delta T$ in which $T_1$ is the signal supplied by the measurement probe.

Advantageously, the measurement probe as well as the two corrective probes each have a temperature pick-up placed in gas flow taken from a gas to be measured by a non-adiabatic sampling mechanism. The thermal exchange efficiency $K_2$ of the sampling circuit of one of the corrective probes is twice that $K_1$ of the sampling circuit of the measurement probe, while the exchange efficiency $K_3$ of the sampling conduit of the other corrective probe is equal to $K_1$. Moreover, preferably, the pick-ups of the three probes are of the thermocouple type and are identical thermocouple weldings, each mounted in opposition to its neighbor.

This measurement system thus makes it possible to compensate for the measurement errors of indirect-measurement temperature pick-ups by sampling in both permanent and transitory operating conditions, and it is advantageously applied to measuring the temperature of the gases leaving the combustion chambers of a turbojet engine.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
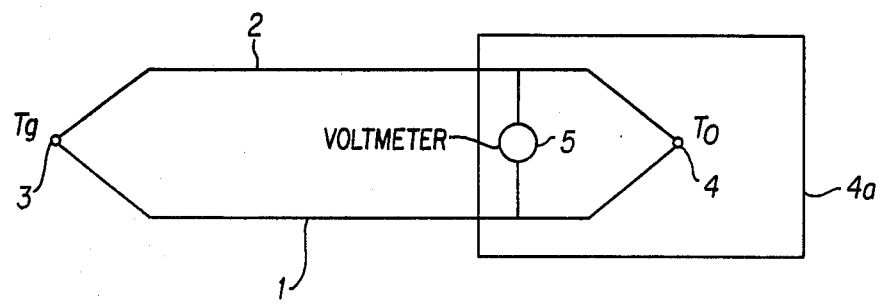
FIG. 1 is a diagram of a classic prior art thermocouple.

The thermocouple shown in FIG. 1 is composed of two conductors 1 and 2 respectively, of chromel and alumel, for example, welded together at both ends. One end, called a measurement sensor weld or hot weld 3, is exposed to the temperature to be measured $T_g$ and the other end, called cold weld 4, is kept at a reference temperature $T_0$ present in an enclosure 4a. A voltmeter 5 indicates the difference in potential between the two conductors 1, 2 and this difference in potential is representative of the temperature to be measured $T_g$.

When the measurement weld 3 is placed in contact with the gases sampled through a fixed blade 30 of the turbine nozzle (FIG. 2), the temperature $T_1$ read by a probe containing the sensor 3 is incorrect by an error $\Delta T$ due to the heat exchange which take place in the bearer blade 30 in the sample feeding the weld between the gases initially at the temperature $T_g$ and the walls of the blade 30.

To avoid placing weld 3 inside the turbine, gases are taken through several holes or sampling conduits 6 in a leading edge 30a of a blade 30, or a series of blades distributed circumferentially on the nozzle, weld 3 is placed at the end of blade 30 in a gas current 100 thus taken in the stream 101 and the gases are then exhausted directly into atmosphere 7.

Weld 3 thus "sees" a mean temperature from several radial levels in the stream but the gases, circulating in the sampling conduits or channels 8a, 8b, 8c and in the central channel 9 of the blade 30 exchange calories with the walls of these channels, and the temperature "seen" by the weld is therefore incorrect by an error $\Delta T$. The thermal exchange efficiency K between the sampling conduits and the gas can be defined by the formula $K=(Tg-T_1)/(Tg-Tm)$ in which Tm is the mean temperature of the sampling conduit walls, which is generally incorrect by a permanent error associated with the cooling of the blade by its support. The temperature $T_1$ measured by the measurement probe may be written:

$$T_1 = Tg + K(Tm - Tg),$$

whence $\Delta T = K (Tm - Tg)$. Compensation for this error $\Delta T$ is obtained as follows.

Since the error $\Delta T$ corresponds to the temperature variation of the gases sampled through blade 30, a measurement of $\Delta T$ can be obtained by generating in the same way as $\Delta T$ a temperature variation $2\Delta T$ and by measuring the difference:

$$(Tg + 2\Delta T) - (Tg + \Delta T) = \Delta T,$$

which is the parasitic error.

Figure 3:
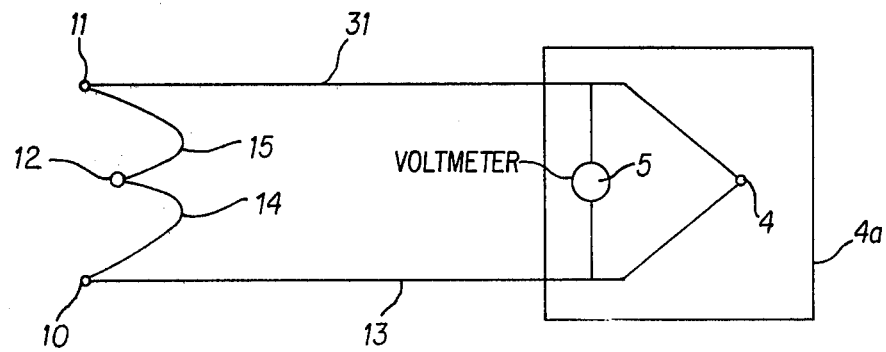
FIG. 3 is a diagram of a thermocouple circuit according to a first embodiment of the invention.

According to a first mode of realization, to subtract $(Tg + \Delta T)$ from $(Tg + 2\Delta T)$, it is enough to have two corrective thermocouples measuring these temperatures in mutual opposition according to the diagram in FIG. 3.

In FIG. 3 the cold weld, the enclosure where the reference temperature $T_0$ is found, and the thermocouple's measurement voltmeter have been designated by the same reference numbers as in FIG. 1. The system in FIG. 3 includes three welds: a measurement sensor or weld 10, like weld 3 in FIG. 2, exposed to the temperature $T_1$ of the gases coming out of the channel 9, and two sensor or corrective welds 11 and 12 mounted in opposition to one another, of which one weld 11 is exposed to a temperature $T_3$ equal to that to which weld 10 is exposed, the two fluid sampling conduits being identical, while the other corrective weld 12 is exposed to a temperature $T_2$ of gases taken in sampling conduits analogous to the conduits 8a to 8c and 9, but having a thermal exchange efficiency K2 with the sample gas twice that of conduits 8a to 8c and 9. The ratio between the efficiencies K of the various fluid sampling conduits can be adjusted by acting on the geometry (diameter and length) of the sampling channels.

According to the embodiment in FIG. 3, measurement weld 10 is the joint—or weld—between an alumel conductor 13 connecting the cold weld 4 to this weld 10 and also a chromel conductor 14 connecting weld 10 to corrective weld 12. Corrective weld 12 is the joint between this chromel conductor 14 and also an alumel conductor 15 connecting weld 12 to weld 11 and corrective weld 11 is the joint between alumel conductor 15 and also a chromel conductor 31 connecting weld 11 to cold weld 4. Thus voltmeter 5 receives a voltage representative of the temperature:

$$T_1 - (T_2 - T_3) = T_1 - T_2 + T_3 = (Tg + \Delta T) - (Tg + 2\Delta T) + (Tg + \Delta T) = Tg$$

Figure 4:
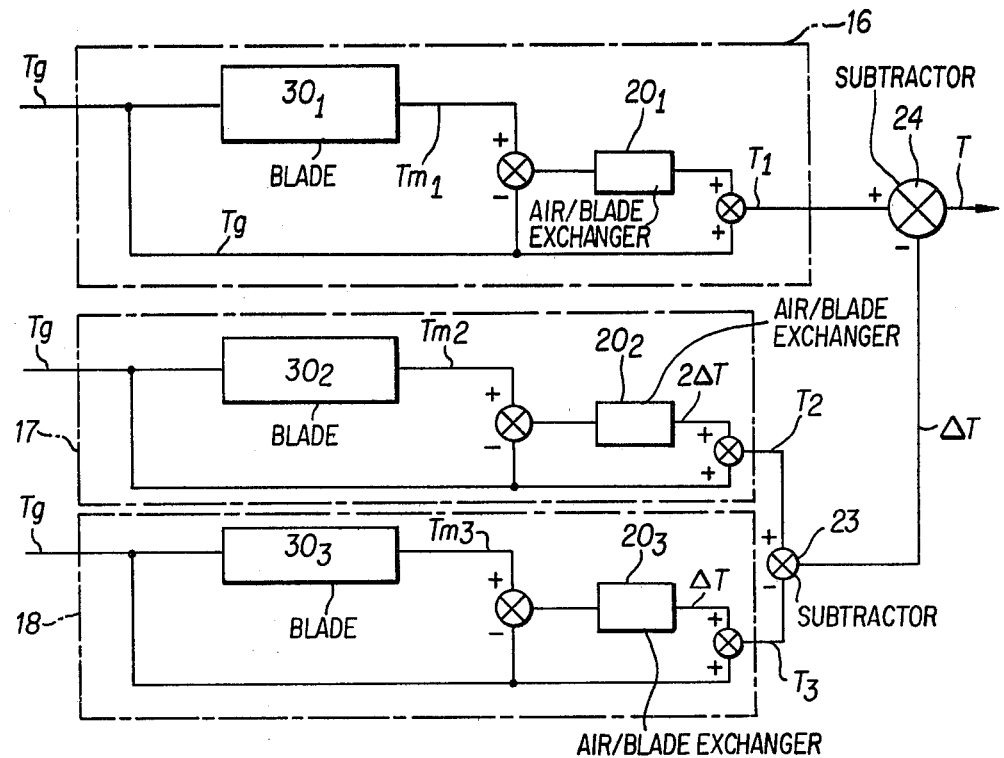
FIG. 4 is an explanatory and functional diagram of a temperature probe system according to this first mode of realization of the invention.

FIG. 4 shows diagrammatically the functioning of this first mode of realization of the system for measuring the temperature of gases Tg, making it possible to obtain the compensation sought.

Figure 2:
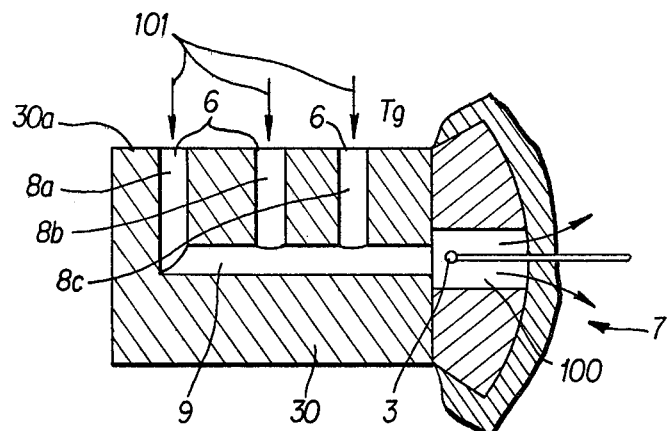
FIG. 2 is a diagrammatic view in section of a turbine nozzle blade equipped with fluid sampling conduits and a temperature pick-up.

According to this embodiment, the system includes three devices for measuring the temperature of gases Tg:

(1) A first device 16 in which the function $T_1 = Tg + K_1(T_{m1} - Tg)Tm_1$ is achieved, element $30_1$ corresponding to blade 30 in FIG. 2, brought to the temperature $Tm_1$, which is the mean temperature of the walls of the sampling conduit of the gasses sampled through blade 30; element $20_1$ corresponding to the air/blade exchanger in which the exchange efficiency between the sampling conduit and the gas is $K_1$; and unit 16 corresponding to the weld 10 in FIG. 3;

(2) A second device 17 in which the function $T_2 = Tg + K_2 (Tm_2 - Tg)$ is realized, element $30_2$ corresponding to the blade 30 in FIG. 2, brought to a temperature $Tm_2 = Tm_1$, $Tm_2$ being the mean temperature of the fluid sampling conduit walls; element $20_2$ corresponding to the air/blade exchanger in which the exchange efficiency between the sampling conduit and the gas is $K_2 = 2K_1$; and unit 17 corresponding to the weld 12 in FIG. 3;

(3) A third device 18 in which the function $T_3 = Tg + K_3 (Tm_2 - Tg)$ is realized, element $30_3$ corresponding to the blade 30 in FIG. 2, brought to the temperature $Tm_3 = Tm_1$, $Tm_3$ being the mean temperature of the fluid sampling conduit walls; element $20_3$ corresponding to the air/blade exchanger in which the exchange efficiency between the sampling conduit and the gas is $K_3 = K_1$; and unit 18 corresponding to the weld 11 in FIG. 3.

A first subtractor member 23 represents the assembly in opposition of the welds 11 and 12 in FIG. 3 and performs the measurement $\Delta T = T_2 - T_3$. A second subtractor member 24 represents the assembly in opposition of welds 10 and 12 in FIG. 3 and performs the measurement $T = T_1 - \Delta T = Tg$. The same result could be obtained by other members utilizing other temperature pick-ups than the thermocouples and other subtractor members than those utilized in FIG. 3 without going beyond the scope of the invention.

Figure 5A:
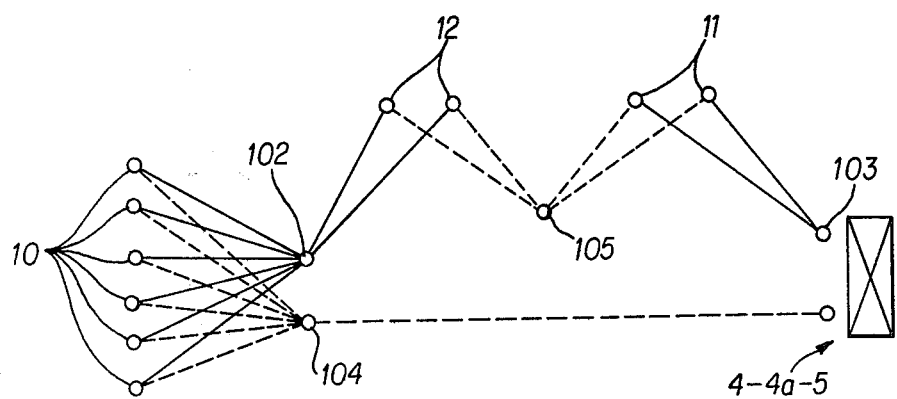
FIGS. 5A and 5B are thermocouple electrical circuit diagrams according to other embodiments.
Figure 5B:
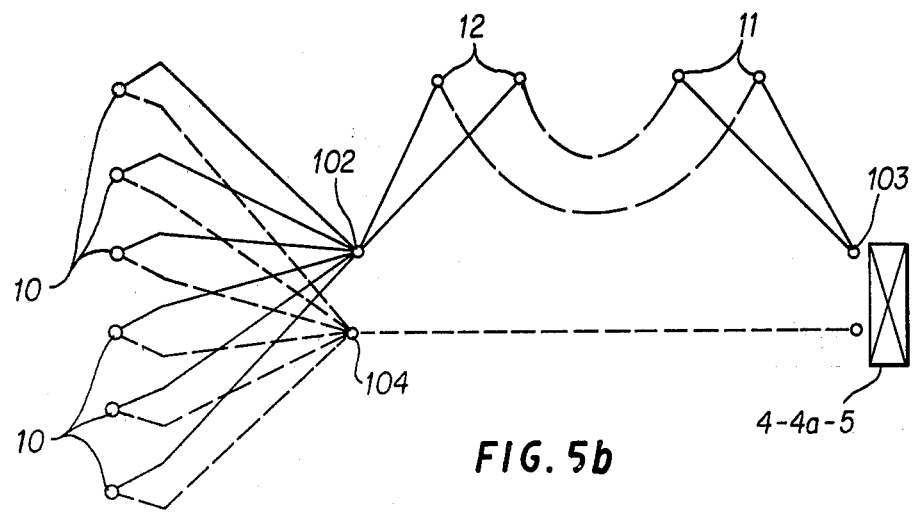

In other possible embodiments, in order to increase the reliability of the thermocouple circuit, it may be preferred to utilize an electrical circuit such as that in FIGS. 5a–5b, which has a greater number of welds, for example six measurement welds 10, two corrective welds 11, and two corrective welds 12. These ten welds are distributed circumferentially in the turbine nozzle and may be wired, for example as shown in FIG. 5b. The conductors shown in dashed lines are of chromel, and those shown in continuous lines are of alumel.

It will be noted in the two FIGS. 5a and 5b that measurement welds 10 all run in parallel between two nodes 102 and 104. In FIG. 5a the corrective welds 11 run likewise in parallel between two nodes 103 and 105 and corrective welds 12, likewise, between nodes 102 and 105, so that the group of corrective welds 12 is in opposition to the group of measurement welds 10 on the one hand and the group of corrective welds 11 on the other.

FIG. 5b is a variation of the preceding assembly, in which corrective welds 11 and 12 are connected one by one in opposition, these connections being run in parallel between two nodes 102 and 103 so that welds 12 are always in opposition to welds 10 and 11 on either side.

The compensation principle described above therefore makes it possible to develop a system particularly well adapted to compensating for errors affecting the temperature pick-ups in turbojet engines under normal operating conditions, without necessitating measurement of the absolute value of the error, but only its relationship with a system having a double error developed from the same physical phenomena.

Figure 6:
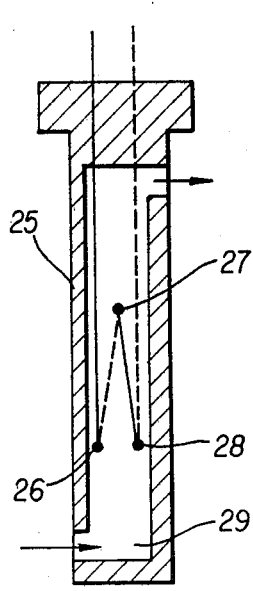
FIG. 6 is a diagrammatic view in section of a temperature probe system according to the first embodiment of the invention.

An alternate embodiment shown in FIG. 6 in addition makes it possible to avoid the need for recourse to supplementary blades to house compensation welds 11, 12. According to this alternate embodiment, in a single probe body 25 three welds 26 to 28 are grouped, arranged as those (10 to 12) in the preceding system, and weld 27 has an exchange efficiency twice that of the other two welds 26 and 28.

Figure 7:
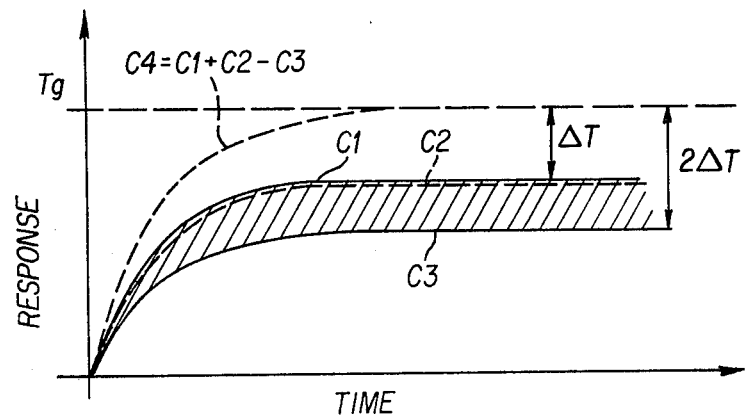
FIG. 7 is a time-function diagram of the response of the various pick-ups in the system according to the invention.

As in FIG. 3, weld 28 is mounted in opposition in relation to weld 27, which is itself mounted in opposition in relation to weld 26. The ratio between the thermal exchange efficiencies of weld 27 and of two welds 26 and 28 is here made equal to 2, for example by means of a greater or lesser relative sinking in channel 29 through which the samples of air traverses probe 25. FIG. 7 shows diagrammatically the evolution in time of the response of welds 10 to 12.

Curves $C_1$ and $C_2$, corresponding to welds 10 and 11, respectively, have an error $\Delta T$ in relation to the temperature $T_g$ of the gases. Curve $C_3$, corresponding to weld 12, has a double error $2\Delta T$ in relation to $T_g$.

Since the weld is mounted in opposition in relation to the other two welds, the errors in curves $C_1$, $C_2$ and $C_3$ are algebraically added and compensate for one another. On voltmeter 5 a discharge signal is obtained which evolves according to curve $C_4$, thus achieving a measurement in which the error is nil by simple adaptation of the air sampling currents feeding the welds of the thermocouples.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A system for measuring the temperature of a moving fluid, through an apparatus, said system comprising:
   (a) a fluid sampling conduit in fluid communication with the main body of the fluid the temperature T of which is to be measured;
   (b) at least one temperature sensor in a measurement probe located at a first point in said fluid sampling conduit, said at least one temperature measurement probe generating a signal $T_1$ representative of the temperature of the fluid in said fluid sampling conduit at said first point, said temperature $T_1$ differing from the temperature T by an error $\Delta T$ because of the heat loss of the fluid from the conveyance of the fluid through the sampling conduit to said first point;
   (c) at least one first corrective temperature sensor in a measurement probe disposed in said fluid sampling conduit, said at least one first corrective temperature measurement probe generating being connected so as to generate a signal $T_3$ which differs from the temperature T by essentially the same error $\Delta T$ as said at least one temperature measurement probe;
   (d) at least one second corrective temperature sensor in a measurement probe disposed in said fluid sampling conduit, said at least one second corrective temperature sensor and said at least one first corrective temperature being connected so as to generate a signal $T_2$ which differs from the temperature T by an error $2\Delta T$ which is essentially twice the error $\Delta T$
   (e) first calculation means for determining the difference $\Delta T$ between the signal $T_3$ supplied by said at least one first corrective temperature measurement probe and the signal $T_2$ supplied by said at least one second corrective temperature measurement probe; and
   (f) second calculation means for calculating the temperature T according to the formula $T = T_1 - \Delta T$.

2. A system according to claim 1 wherein:
   (a) said fluid sampling conduit is non-adiabatic;
   (b) the thermal efficiency $K_2$ of said fluid sampling conduit at the location of said at least one first corrective temperature probe is twice the thermal efficiency $K_1$ of said fluid sampling conduit at the location of said at least one temperature measurement probe; and
   (c) the thermal efficiency $K_3$ of said fluid sampling conduit at the location of said at least one second corrective temperature probe is equal to the thermal efficiency $K_1$ of said fluid sampling conduit at the location of said at least temperature measurement probe.

3. A system according to claim 1 wherein said temperature measurement probes comprise thermocouple pick-up members.

4. A system according to claim 3 wherein said thermocouple pick-up members comprise identical thermocouple welds each of which is mounted in opposition to a neighboring thermocouple pick-up member.

5. A system according to claim 4 wherein:
   (a) said at least one temperature measurement probe is fed by thermal-exchange efficiency $K_1$ type sampling conduits;
   (b) said at least one first corrective temperature measurement probe is fed by thermal-exchange efficiency $K_2$ type sampling conduits;
   (c) said at least one second corrective temperature measurement probe is fed by thermal-exchange efficiency $K_3$ type sampling conduits; and
   (d) welds of a single function are connected in parallel to form a group, said system having at least one weld group of the same function connected in parallel.

6. A system according to claim 5 wherein the welds of at least two different adjacent functions are equal in number and are connected in series-opposition to form a series of adjacent welds, said series of adjacent welds being connected in parallel.

* * * * *

UNITED STATES PATENT AND TRADEMARK OFFICE
CERTIFICATE OF CORRECTION

PATENT NO. : 4,423,967

DATED : January 3, 1984

INVENTOR(S) : Pierre C. Mouton

It is certified that error appears in the above-identified patent and that said Letters Patent is hereby corrected as shown below:

Column 1, line 10, insert "to" before --be--.

Column 3, line 37, delete "measurement" before --sensor--.

Column 5, line 62, delete "generating".

Column 6, line 35 change "Claim 1" to --Claim 2--.

Signed and Sealed this

Eleventh Day of September 1984

[SEAL]

Attest:

GERALD J. MOSSINGHOFF

Attesting Officer

Commissioner of Patents and Trademarks